US008864247B2

(12) United States Patent
Hilberer (10) Patent No.: US 8,864,247 B2
(45) Date of Patent: *Oct. 21, 2014

(54) BRAKING SYSTEM FOR A UTILITY VEHICLE THAT CAN BE PNEUMATICALLY COUPLED TO A TRAILER, AND METHOD FOR OPERATING SUCH A BRAKING SYSTEM IN THE EVENT OF DEFECTS

(75) Inventor: Eduard Hilberer, Hockenheim (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 986 days.

This patent is subject to a terminal disclaimer.

(21) Appl. No.: 12/600,431

(22) PCT Filed: May 16, 2008

(86) PCT No.: PCT/EP2008/003955
§ 371 (c)(1),
(2), (4) Date: Jul. 8, 2010

(87) PCT Pub. No.: WO2008/138641
PCT Pub. Date: Nov. 20, 2008

(65) Prior Publication Data
US 2011/0168505 A1    Jul. 14, 2011

(30) Foreign Application Priority Data
May 16, 2007    (DE) .......................... 10 2007 023 345

(51) Int. Cl.
*B60T 8/88* (2006.01)
*B60T 13/26* (2006.01)
*B60T 13/68* (2006.01)
*B60T 7/20* (2006.01)
*B60T 17/22* (2006.01)
*B60T 8/24* (2006.01)

(52) U.S. Cl.
CPC ............... *B60T 13/26* (2013.01); *B60T 13/683* (2013.01); *B60T 7/20* (2013.01); *B60T 17/221* (2013.01); *B60T 8/248* (2013.01)
USPC ........ 303/122.15; 303/3; 303/122.1; 303/123

(58) Field of Classification Search
USPC ................. 303/6.01, 9.66, 9.76, 124, DIG. 1, 303/DIG. 2
See application file for complete search history.

(56) References Cited

U.S. PATENT DOCUMENTS 4,616,881 A * 10/1986 Muller et al. ..................... 303/7
4,697,852 A * 10/1987 Scholz ............................. 303/7

(Continued)

FOREIGN PATENT DOCUMENTS

| EP | 1 022 204 A2 | 7/2000 |
| EP | 1 780 087 A1 | 5/2007 |
| WO | WO 2005/025958 A1 | 3/2005 |

OTHER PUBLICATIONS

International Search Report dated Nov. 6, 2008 including English translation (Four (4) pages).

*Primary Examiner* — Thomas Irvin
(74) *Attorney, Agent, or Firm* — Crowell & Moring LLP (57) ABSTRACT

A braking system is provided for a commercial vehicle that can be pneumatically coupled to a trailer. The system includes at least one electronic control unit, and a valve device that can be electrically connected by the at least one electronic control unit. The at least one valve device builds up pressure for the trailer braking system when connected, causing the trailer to brake. A throttle is arranged in a trailer control line. The throttle limits a pressure drop at the control inlet of a relay valve in the event of a leakage downstream of the throttle. A method for controlling a brake system is also provided.

18 Claims, 6 Drawing Sheets

(56) References Cited

U.S. PATENT DOCUMENTS

| | | | |
|---|---|---|---|
| 5,046,786 A * | 9/1991 | Johnston et al. | 303/7 |
| 5,333,940 A * | 8/1994 | Topfer | 303/7 |
| 5,848,826 A * | 12/1998 | Muller | 303/22.4 |
| 6,817,247 B1 * | 11/2004 | Hilberer | 73/714 |
| 7,080,891 B1 * | 7/2006 | Hilberer | 303/6.01 |
| 7,370,917 B2 * | 5/2008 | Battistella et al. | 303/7 |
| 7,431,406 B2 * | 10/2008 | Aumuller et al. | 303/15 |
| 7,513,576 B2 * | 4/2009 | Hilberer | 303/6.01 |
| 7,784,879 B2 * | 8/2010 | Koelzer | 303/3 |
| 7,802,425 B2 * | 9/2010 | Fries et al. | 60/329 |
| 7,821,154 B2 * | 10/2010 | Hilberer | 307/9.1 |
| 7,886,532 B2 * | 2/2011 | Hilberer | 60/329 |
| 8,172,339 B2 * | 5/2012 | Fries et al. | 303/11 |
| 8,512,208 B2 * | 8/2013 | Hilberer | 477/199 |
| 2004/0012249 A1 * | 1/2004 | Koelzer | 303/3 |
| 2006/0175894 A1 * | 8/2006 | Battistella et al. | 303/7 |
| 2006/0244305 A1 | 11/2006 | Hilberer | |
| 2010/0252378 A1 * | 10/2010 | Hilberer | 188/106 F |
| 2010/0304929 A1 * | 12/2010 | Hilberer | 477/183 |
| 2011/0303501 A1 * | 12/2011 | Hilberer et al. | 188/170 |

\* cited by examiner

BRAKING SYSTEM FOR A UTILITY VEHICLE THAT CAN BE PNEUMATICALLY COUPLED TO A TRAILER, AND METHOD FOR OPERATING SUCH A BRAKING SYSTEM IN THE EVENT OF DEFECTS

BACKGROUND AND SUMMARY OF THE INVENTION

The invention relates to a braking system for a commercial vehicle which can be coupled pneumatically to a trailer, having at least one electronic control unit and a valve device which can be switched electrically by the at least one electronic control unit, wherein in a switched state of the at least one valve device pressure can be built up for a trailer braking system, which pressure brings about braking of the trailer.

The invention further relates to a method for controlling a braking system for a commercial vehicle which can be coupled pneumatically to a trailer, having at least one electronic control unit, a valve device which can be switched electrically by the at least one electronic control unit, wherein in a switched state of the valve device pressure can be built up for the trailer braking system, which pressure brings about braking of the trailer, and a throttle which is arranged in a trailer control line.

When commercial vehicles are coupled to a trailer, it is also usually necessary to lay supply lines between the trailer and the commercial vehicle. These connecting lines comprise at least one pneumatic supply line for supplying the compressed-air-operated trailer components and a separate pneumatic control line for controlling the trailer brake, and they initially run from an EAC or a parking brake module to a trailer control module. The connecting lines may be flexible and are of course subject to an aging process since they are continuously subjected to influences of the weather. A leak in the region of these connecting lines is therefore merely a question of time. However, a suddenly occurring loss of pressure, in particular during travel, can endanger traffic and can result, for example, in uncontrolled braking of the vehicle combination.

The invention is based on the object of making available, with the simplest structural means possible, a braking system which has operating properties which are improved in terms of its operating behavior when there is a sudden loss of pressure in the connecting lines to a trailer control module.

The invention is based on the generic braking system in that a throttle is arranged in a trailer control line which, in the event of a leak downstream of the throttle, limits a pressure drop at a control inlet of a relay valve. By providing a throttle in the trailer control line it is possible, by virtue of the accumulating effect of the throttle, to avoid a leak causing a rapid loss of pressure upstream of the throttle. Depending on the throttle effect and the volume of air flowing on upstream of the throttle, a limiting pressure may occur in the region upstream of the throttle. Said limiting pressure may be sufficiently large, in particular through the selection of a small throttle cross section, to allow the braking system of the commercial vehicle to continue to be activated. The throttle itself may, for example, easily be embodied as a bore.

In particular it is possible to provide that the compressed air supply of the braking system is provided by means of a pressure limiter. The pressure-limited supply of the braking system permits the overload at the individual spring-loaded brake cylinders to be reduced.

There is advantageously provision that a non-return valve is arranged downstream of the pressure limiter in order to jointly protect the parking brake of the commercial vehicle and the trailer parking brake control system. The joint protection of the parking brake and of the trailer parking brake control system is a simple form of protection compared with other compressed air consumers in the event of a leak.

It is possible to provide that the compressed air supply of the parking brake of the traction vehicle is provided in parallel with the compressed air supply of the trailer parking brake control system. The parallel compressed air supply of the parking brake of the traction vehicle and of the trailer parking brake control system permits the valve configurations to be independent of one another. In particular, the valves for the trailer parking brake control system can be configured for a relatively low volume of air.

It is possible that a pressure sensor senses the control pressure for the trailer braking system and transmits a corresponding signal to the electronic control unit. By virtue of the pressure sensor, a pressure drop which is caused by a leak can be detected within the commercial vehicle itself.

According to one preferred embodiment there is provision that a hold valve is arranged between the at least one electrically switchable valve device and a relay valve. Since in the event of a leak a volume of air can continuously escape via the throttle, further air must continuously be fed in in order to make available the pressure for actuating the relay valve. As a result of the closing of the hold valve, the control pressure for the relay valve can also be maintained independently of the leak.

The invention is based on the generic method by virtue of the fact that a pressure drop which occurs when there is a leak downstream of the throttle is limited by the throttle, wherein a control inlet of a relay valve is arranged upstream of the throttle.

In this way, the advantages and particularities of the braking system according to the invention are also implemented within the scope of a method. This also applies to the particularly preferred embodiments of the method according to the invention which are disclosed below.

This is advantageously developed by virtue of the fact that when a leak has occurred a valve device which is arranged upstream of the control inlet is closed in order to avoid a pressure drop at the control inlet.

Furthermore it is possible to provide that the at least one electrically switchable valve device interrupts further feeding-in of compressed air in order to stop a continuous loss of air when a leak has occurred. The interruption of the further feeding-in of compressed air, for example by closing the electrically switchable valve device, ends the continuous loss of pressure via the throttle.

It is also preferred that, in parallel with the outputting of the pressure signal at the control ports, a corresponding electrical control signal is transmitted via a CAN bus. If a corresponding electrical control signal is transmitted to the trailer or to the trailer control module in parallel with the pressure signal, redundancy is generated which permits operation of the trailer braking system even when there is a leak in the pneumatic control line.

In this context, it is also possible to provide that the electrical control signal and the pressure signal are compared with one another, and that a leak is reported via the CAN bus if the signals are not equivalent.

By comparing the two signals, it is possible to detect a pressure drop in the pneumatic control line if there is no fault message present for the electrical control signal and the pneumatic control signal predefines a lower braking effect for the parking brake than the electrical signal.

A further possible safety measure is that when signals are not equivalent the electrical signal is used to control the trailer.

It is then particularly advantageous that when a leak has occurred an electrical signal is transmitted to the control device in order to reduce or to prevent braking of the trailer. If the braking system of the trailer can no longer be activated, or can only be activated to a restricted degree, it may be advantageous to dispense with an anti-jackknifing braking functionality which is implemented via the braking system of the trailer. This applies in particular since it can be assumed that the braking effect of the trailer parking brake which is necessary for the anti-jackknifing braking cannot be maintained.

Furthermore, it may be advantageous that a fault message is output to the driver of the commercial vehicle if a leak is detected. The outputting of a fault message to the driver can permit the driver to adapt his driving style to the defect which is present, to exchange the defective connecting line or to visit a workshop in order to remedy the fault.

In this context it is also advantageous that a fault entry is made in a fault memory if a leak is detected.

In order to detect a defect, there is preferably provision that a leak in a trailer control line is detected by means of a pressure sensor which is arranged upstream of the throttle.

However, it is also possible to provide that a leak in a trailer control line is detected by means of a pressure sensor which is arranged in a trailer control module. A defect, that is to say a line break, can be assumed to have occurred when the trailer starts to brake even though the content of the CAN data protocol does not indicate braking as a status of the parking brake which can be actuated electrically (ECPB). The braking can then be detected only by means of the wheel speed sensors of the trailer.

Alternatively it is also contemplated for a leak in a trailer control line to be detected by means of a wheel speed which is arranged on a trailer.

In conjunction with the invention it may also be advantageous to have a braking system for a commercial vehicle which can be coupled pneumatically to a trailer, having at least one electronic control unit, a valve device which can be switched electrically by the at least one electronic control unit, wherein in a switched state of the valve device pressure can be built up for the trailer braking system, which pressure brings about braking of the trailer, and a pressure sensor which senses the pressure for the trailer braking system and transmits a corresponding signal to the electronic control unit, wherein the pressure for the trailer braking system can be influenced by the electronic control unit by pulsed switching of the valve device taking into account the pressure for the trailer braking system which has been sensed by the pressure sensor, and wherein the electronic control unit permits the pulsed switching in order to bring about braking of the trailer when the service brake of the traction vehicle is not active only if a condition applies according to which braking of the trailer could be appropriate despite the service brake of the traction vehicle not being active and such anti-jackknifing braking is requested by a signal generator. This braking system therefore makes available a type of filter which ensures that no unnecessary actuation of the switching valves takes place outside actually desired and appropriate anti-jack-knifing braking phases. The switching valves are therefore no longer subjected to continuous pulsed actuation whenever the driver of the commercial vehicle expresses a corresponding request by means of a signal generator, and this has a positive effect on the service life of the actuated solenoid valves and of the brakes. The pulsed actuation can cause, for example in a pulse-width-modulated fashion, the pressure which is to be influenced to be varied, and this braking system is mainly explained using the example of pulse-width modulation within the scope of the present disclosure without restriction of the generality. The abovementioned pressure for the trailer braking system may be a control pressure on the basis of which the actual brake pressure for the trailer braking system is generated.

In particular it is possible to provide that the condition corresponds to the presence of at least one of the following states: the vehicle speed is lower than a threshold value, the accelerator pedal is not actuated, the engine is braking, the engine is not generating any usable torque, a retarder system is active or the vehicle is located on a section of road with a negative gradient. Such a driving state occurs frequently during sustained-action braking since the traction vehicle is then braked by the engine and the retarder system, while the trailer is not braked.

The retarder system and the engine brake are also referred to as sustained-action brakes. These are frequently actuated by a separate signal generator or switch, these switches usually being switched in a stepped fashion.

Arrangements in which the engine brake can be switched on independently of the retarder system are also known, but in this context there is usually a possibility of exerting combined influence and carrying out resulting adjustment of the systems with respect to one another. There is frequently provision for the sustained-action braking deceleration to be adjusted automatically to the deceleration of a preceding braking operation by a service brake. The signal generator for the anti-jackknifing braking can be provided separately or combined with the signal generator for the engine braking or the retarder braking. It is also possible to equip the manual control unit for an electric parking brake with an additional function, with the result that the signal for the initiation of anti-jackknifing braking can be generated in this way. On this basis, the condition for the approval of the anti-jackknifing braking can be coupled to the characteristic driving states of the vehicle. In this context it is possible to take into account only one driving state or else also a plurality of driving states, in particular all of the specified driving states. It is possible, for example, to prevent pulse-width-modulated actuation of the switching valves, that is to say of the solenoid valves, from taking place if the vehicle is moving at a high speed at which an anti-jackknifing braking function should not occur. It is also possible to provide that when the accelerator pedal is actuated an anti-jackknifing braking function is prevented in all cases because it is improbable that the trailer could run into the rear of the traction vehicle in such a state. Furthermore, a criterion for the approval of the anti-jackknifing braking can be that the engine is braking since this characterizes a typical driving situation which makes anti-jackknifing braking appear appropriate or necessary. Furthermore, it is possible to check, in particular by means of the engine control device, whether the engine is generating a usable positive torque. If this is not the case, this is a criterion for permitting the anti-jackknifing braking.

Through combined sustained-action braking using a retarder system it is also possible to bring about deceleration of the commercial vehicle. If such a retarder system is active, it may be appropriate to permit anti-jackknifing braking. It is also possible to check whether the vehicle is located on a section of road with a negative gradient, in which case this checking is carried out on the basis of an inclination sensor system or of navigation data. If this checking reveals that a negative gradient is not present, the pulse-width-modulated actuation of the switching valves can also be suppressed.

During the control of the anti-jackknifing braking function it is also possible to take into account the wheel speeds of the traction vehicle and trailer as well as the steering angle. It is possible, for example on the basis of a slip comparison between the trailer and the traction vehicle, to determine that the trailer is about to run into the rear of the traction vehicle. Taking into account the steering angle may be appropriate since at different steering angles the vehicle is influenced by anti-jackknifing braking in different ways.

With respect to the driving behavior of the commercial vehicle it may also be appropriate to take into account the different load distribution, brought about by an e differential, on a sustained-action braking operation which is brought about, in particular, by the engine and a retarder brake. An e differential is a stepless differential for adapting engine acceleration torques to the forces which can be applied to the underlying surface by the wheels. An e differential distributes the wheel forces individually among the various wheels in an appropriate way. Subsequent to a sustained-action braking operation, it is appropriate, when the vehicle accelerates due to the accelerator pedal being activated, to extend the vehicle combination as quickly as possible and not to permit the engine speed to drop into a range in which the engine could stall under certain circumstances. In this context it may be desired to release the anti-jackknifing brake before the transition to renewed acceleration of the vehicle combination, which reduces the overall loading on components.

Further consideration can be given to the travel sensor system of the chassis control system and of the pneumatic suspension, which, together with the steering angle and the slip during cornering, provide a point of reference via the shearing forces of the trailer when the sustained-action braking system is activated.

Modern vehicles also frequently have an active steering system which can make available steering angle signals to the control electronics during the anti-jackknifing braking process in order to perform an automatic steering angle correction. On this basis, an anti-jackknifing braking process can be ended early in order also in this way to reduce the loading on the components and to improve the driving stability. Furthermore, if an active shock absorber control system is present, it may be helpful to adjust the shock absorber to a higher degree of hardness in order to prevent rolling movements and also in this way be able to end an anti-jackknifing braking process more quickly, and this also reduces loading on the controlling components, that is to say the valves and the brakes, and improves the driving stability.

There is advantageously provision that a pressure limiter is connected upstream of the valve device. A pressure limiter is appropriate since the number of necessary switching cycles also rises owing to the requirement for more frequent and more sensitive clocking as the supply pressure increases. The pressure limiter therefore has an advantageous influence on the service life of the valves.

It is possible to provide that the valve device is a 3/2-way valve. On this basis, it is possible to implement a ventilation and venting function with a single valve.

It is also possible to provide that the valve device comprises two 2/2-way valves. One of the 2/2-way valves is then used for venting, while ventilation is carried out with the other. If neither of the valves is actuated, the pressure is maintained, in which case ventilation and venting is carried out very frequently during anti-jackknifing braking owing to the critical driving situation.

It is possible for the valve device to make the control pressure available directly. Such a valve device which is configured, for example, as a solenoid valve must make available a sufficient flow cross section.

It is also contemplated for the valve device to actuate a relay valve which makes the control pressure available. It is advantageous for the valve device which is actuated in a pulse-width-modulated fashion to make the control pressure available indirectly via a relay valve since the switching valves which are actuated in a pulse-width-modulated fashion can then be dimensioned and configured independently of the control pressure which is necessary for the anti-jackknifing braking. The pressure pulses are integrated in the control chamber of the relay valve to form a median pressure which is then fed as a control pressure preset value to the trailer braking system.

However, it is also contemplated for the valve device to be integrated into an electropneumatic control unit which controls the parking brake of the traction vehicle and the trailer braking system pneumatically by means of a trailer control module.

In this context it is then advantageous that at least one throttle, which, in the event of a reduction in pressure in the region of the control inlet of the trailer control module, delays a reduction in pressure in the spring-loaded cylinder, is provided in a line system of the electropneumatic control unit, which line system is connected to a spring-loaded cylinder of the parking brake of the traction vehicle and to a control inlet of the trailer control module. Since the electropneumatic control unit couples both the control inlet of the trailer control module and the parking brake cylinders to the compressed air supply, a loss of pressure in the region of the trailer control module could bring about a sudden collapse of the pressure in all the lines of the electropneumatic control unit which are connected thereto, and therefore also in the region of the spring-loaded cylinder. This would result in the traction vehicle being suddenly braked by the parking brake. This is prevented by slowing down a reduction in pressure in the region of the spring-loaded cylinders by means of throttling.

Taking this as a basis, it is then also possible to provide that an unexpected reduction in pressure in the region of the control inlet of the trailer control module can be sensed by the pressure sensor, and the pressure in the spring-loaded cylinder of the parking brake can be held by switching over a valve. The pressure sensor, which is also used in conjunction with the pulse-width-modulated actuation of the valve device, can also be employed to sense an unexpected drop in the pressure in the region of the trailer control module and to then disconnect the spring-loaded cylinder by switching over a valve device from the pressure reducer. In combination with the throttling of pressure it is therefore possible firstly to slow down the reduction in pressure in the spring-loaded cylinder independently of the switching over and sensing of pressure, and then to stop it completely, if necessary, by switching over the valve.

It is advantageously possible to provide that a signal which can be generated by a signal generator which can be operated manually can be fed to the at least one electronic control unit, and the anti-jackknifing braking function can be suppressed as a function of the presence of the signal. This provides the driver with the possibility of switching off the anti-jackknifing braking functionality of the commercial vehicle from the outset.

It is also possible to provide that a variable signal which can be generated by a signal generator which can be activated manually in different ways can be fed to the at least one electronic control unit, in which case at least one property of the signal depends on the method of activation of the signal generator, and the at least one property of the signal influences the braking behavior of the trailer. In particular, it is possible to provide a signal generator which can be activated in different ways. The pressure which is built up for the trailer brake can therefore be influenced as a function of the signal generator travel.

It is likewise possible to provide that a signal which can be generated by a signal generator which can be activated manually can be fed to the at least one electronic control unit, in which case the activation time of the signal generator influences the braking behavior of the trailer. It is therefore possible, for example, to provide that a relatively high pressure is built up when the signal generator is activated for a relatively long time.

There is also advantageously provision that wheel speed sensors are provided whose signals can be fed to the at least one electronic control unit, and that the vehicle speed which is used in conjunction with the condition for the approval of pulsed switching of the valve device can be derived from signals of the rotational speed sensors. On the basis of a comparison between the trailer and the traction vehicle with respect to slip it is possible to determine, for example, that the trailer is about to run into the rear of the traction vehicle. On the part of the traction vehicle, the tachometer signal or data from a navigation system could additionally be used as correction values. Using active wheel speed sensors permits, in particular at low rotational speeds, the provision of values which can be processed very well, which permits rapid stabilization of the vehicle.

It is also possible to provide that the trailer braking system has disk brakes. This is appropriate, in particular in combination with active wheel speed sensors, since disk brakes permit sensitive pressure reduction and improved meterability with low hysteresis, in particular at low vehicle speeds. In particular in the case of difficult conditions of the underlying surface, for example with chippings (μ chippings), it is therefore possible to avoid undesired locking of the wheels.

In conjunction with the method according to the invention, a method for controlling a braking system for a commercial vehicle which can be coupled pneumatically to a trailer, having at least one electronic control unit, a valve device which can be switched electrically by the at least one electronic control unit, wherein in a switched state of the valve device pressure can be built up for the trailer braking system, which pressure brings about braking of the trailer, and a pressure for the trailer braking system and transmits a corresponding signal to the electronic control unit, wherein the pressure for the trailer braking system is influenced by the electronic control unit by pulsed switching of the valve device taking into account the pressure for the trailer braking system which has been sensed by the pressure sensor, and wherein the electronic control unit permits the pulsed switching in order to bring about braking of the trailer when the service brake of the vehicle is not active only if a condition applies according to which braking of the trailer could be appropriate despite the service brake of the traction vehicle not being active, and such anti-jackknifing braking is requested by a signal generator, may also be advantageous.

In this way, the advantages and particularities of the braking system described above are also implemented within the scope of a method. This also applies to the particularly preferred embodiments of the method which are disclosed below.

This method is advantageously developed by virtue of the fact that the condition corresponds to the presence of at least one of the following states: the vehicle speed is lower than a threshold value, the accelerator pedal is not activated, the engine is braking, the engine is not generating any usable torque, a retarder system is active, the vehicle is located on a section of road with a negative gradient.

Furthermore, it is possible to provide that an unexpected reduction in pressure in the region of the control inlet of the trailer control module is sensed by the pressure sensor and the pressure in the spring-loaded cylinder of the parking brake is held by switching over a valve.

It is also preferred that a temperature in the region of the trailer braking system is sensed, and when a predefined temperature threshold is exceeded the pressure for the trailer braking system is reduced. This is a safety measure on the basis of which the loading on the trailer braking system and the valves is reduced.

In this context it is also possible to provide that a temperature in the region of the trailer braking system is sensed, and when a predefined temperature threshold is exceeded anti-jackknifing braking is prohibited.

It is possible to take a further safety measure, specifically in that a time during which anti-jackknifing braking is carried out is sensed, and that when a predefined time threshold is exceeded further anti-jackknifing braking is prohibited. This also prevents possible overloading of the components involved in the anti-jackknifing braking.

It is also possible to provide that during anti-jackknifing braking the activity of the service brake of the traction vehicle is monitored, and that when the service brake of the traction vehicle is activated further anti-jackknifing braking is prohibited. Anti-jackknifing braking in the specific sense is then no longer necessary since the entire braking system of the commercial vehicle is activated and it will stop the vehicle combination in an extended state.

It is particularly advantageous that during anti-jackknifing braking the rotational speed of the engine of the commercial vehicle is monitored. This monitoring of the rotational speed can be performed, for example, via the engine control device of the commercial vehicle, with information relating to this being transmitted to the electronic control unit which is responsible for the anti-jackknifing braking. Such monitoring of the rotational speed is advantageous since in an unfavorable case the anti-jackknifing braking can cause the rotational speed to drop to a range in which the engine can be expected to stall. This should be prevented since then all or virtually all of the functional elements of the vehicle go into a back-up operating mode by changing over, for example, from an electronic control to a pneumatic control, with the result that only a very restricted functionality of the entire braking system is still available. In critical driving situations this adversely affects the maneuverability.

In this context it may be advantageous to reduce the pressure for the trailer braking system when a predefined rotational speed threshold is undershot.

Furthermore it is possible to provide that when a predefined rotational speed threshold is undershot the rate of supply of fuel to the engine of the commercial vehicle is increased.

As a measure against stalling of the engine it is also possible to provide that when a predefined rotational speed threshold is undershot the charge pressure of a turbocharger is reduced.

Furthermore it is possible that when a predefined rotational speed threshold is undershot compressed air is fed to the engine of the commercial vehicle from a compressed air vessel of a compressed air system of the commercial vehicle.

Stalling of the engine can also be prevented by at least partially opening a clutch in a drive train of the commercial vehicle when a predefined rotational speed threshold is undershot.

It is also possible to provide that a transmission of the commercial vehicle is adjusted to a transmission position with a reduced transmission ratio when a predefined rotational speed threshold is undershot.

As a further measure against stalling of the engine it is possible to provide that the effect of the retarder system of the commercial vehicle is reduced when a predefined rotational speed threshold is undershot.

It may also be beneficial for a bypass valve which is arranged between swept volumes of different cylinders of the engine for the purpose of engine braking to be at least partially closed. Such a bypass valve carries out compression work during engine braking by permitting the compressed volume to overflow into the sucking-in piston. Since the bypass valve is closed when there is an excessive drop in rotational speed, the effect of the engine braking can be decreased.

Furthermore it is possible to provide that a throttle valve in an exhaust stream of the engine is adjusted from a throttling position into a less throttling position.

As has already been described in relation to the brake system, the method can advantageously be developed by virtue of the fact that a signal which is generated by a signal generator which can be operated manually is fed to the at least one electronic control unit, and the anti-jackknifing braking function is suppressed as a function of the presence of the signal.

It is also advantageous that a variable signal which is generated by a signal generator which can be actuated manually in different ways is fed to the at least one electronic control unit, with at least one property of the signal depending on the method of activation of the signal generator and the at least one property of the signal influencing the braking behavior of the trailer.

The method can also be favorably developed by virtue of the fact that a signal which is generated by a signal generator which can be activated manually is fed to the at least one electronic control unit, with the activation time of the signal generator influencing the braking behavior of the trailer.

It is also possible for wheel speed sensors to be provided whose signals are fed to the at least one electronic control unit, and for the vehicle speed which is used in conjunction with the condition for the approval of pulsed switching of the valve device to be derived from signals of the rotational speed sensors.

The invention will now be explained by way of example on the basis of particularly preferred embodiments and with reference to the accompanying drawings.

DETAILED DESCRIPTION OF THE DRAWINGS

In the following description of the drawings, identical reference symbols denote identical or comparable components.

Figure 1:
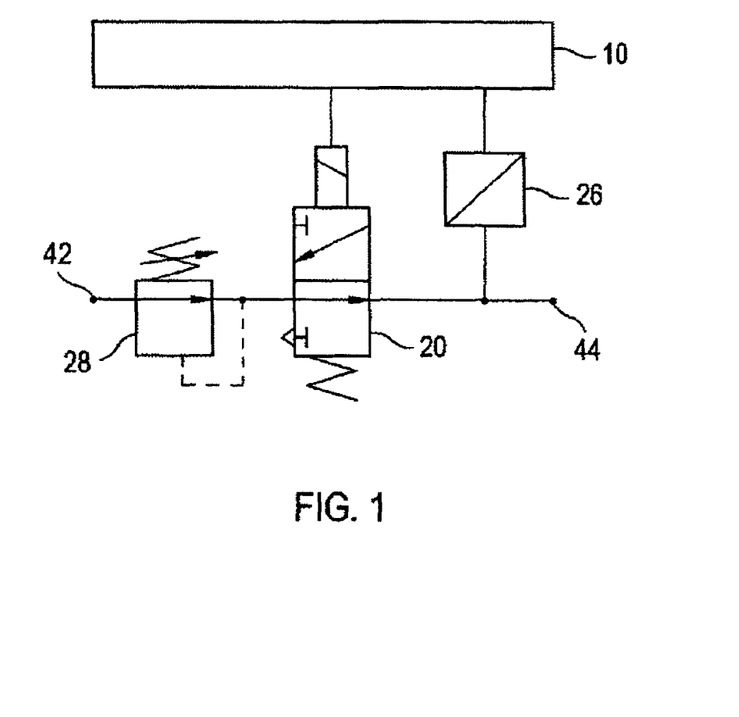
FIG. 1 shows part of a braking system according to the invention.

FIG. 1 shows part of a braking system according to the invention. Compressed air is fed from a compressed air supply 42 to a 3/2-way valve 20 via a pressure limiter 28. On the output side the 3/2-way valve 20 is connected to a trailer control port 44. The output-side pressure of the 3/2-way valve 20 can be sensed with a pressure sensor 26. This pressure sensor transmits the acquired information to an electronic control unit 10 which performs open-loop or closed-loop control of the state of the 3/2-way valve 20 as a function thereof and as a function of other conditions. In order to make available a variable pressure at the trailer control port 44 in a selective fashion, the 3/2-way valve 20 can be actuated in a pulse-width-modulated fashion.

Figure 2:
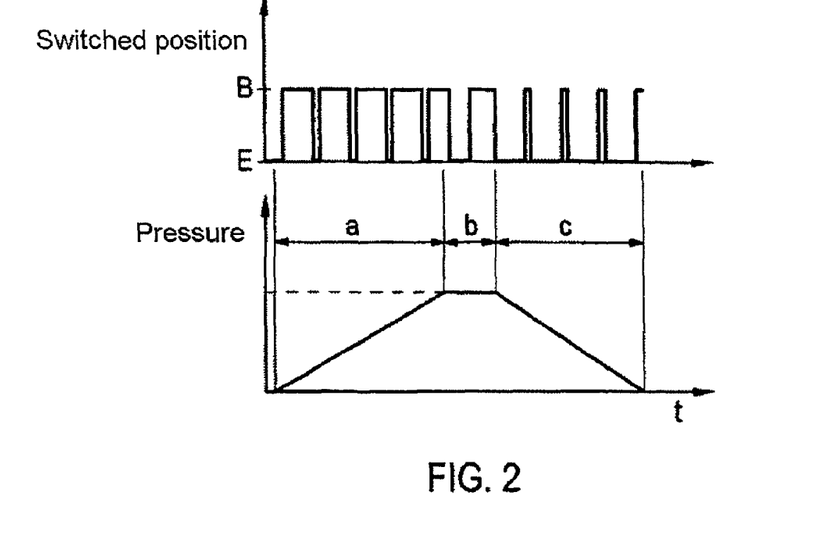
FIG. 2 shows a diagram illustration explaining pulse-width-modulated actuation of a valve device.

FIG. 2 shows a diagram illustration explaining pulse-width-modulated actuation of a valve device. The upper diagram shows the switched state of the valve device 20 according to FIG. 1. In the switched state B, the valve device 20 is in its ventilating position, while in the switched state E the venting position is present. For example, the 3/2-way valve 20 is de-energized in the switched state B, and energized in the switched state E. In the lower diagram, the progression of the pressure at the trailer control port 44 according to FIG. 1 is shown as a function of the switched states of the 3/2-way valve 20 which are shown in the upper diagram. During the phase a, the ratio between the ventilation time and the venting time is adjusted in such a way that a pressure increase takes place. During the phase b, the pulse duty factor for the switched state is changed in favor of the venting switched position, with the result that the pressure at the trailer control port 44 can be held. If the venting switched position still takes up a larger time proportion than the ventilating switched position, as is the case in phase c, a pressure decrease takes place. Depending on the implementation of the present invention, the pressure which is illustrated in the lower diagram can be a control pressure which is fed to the trailer control module and on the basis of which the trailer braking pressure is influenced, or can be the trailer braking pressure directly. In the latter case, the pressure-holding phase b could be set at, for example, approximately 8.5 bar.

Figure 3:
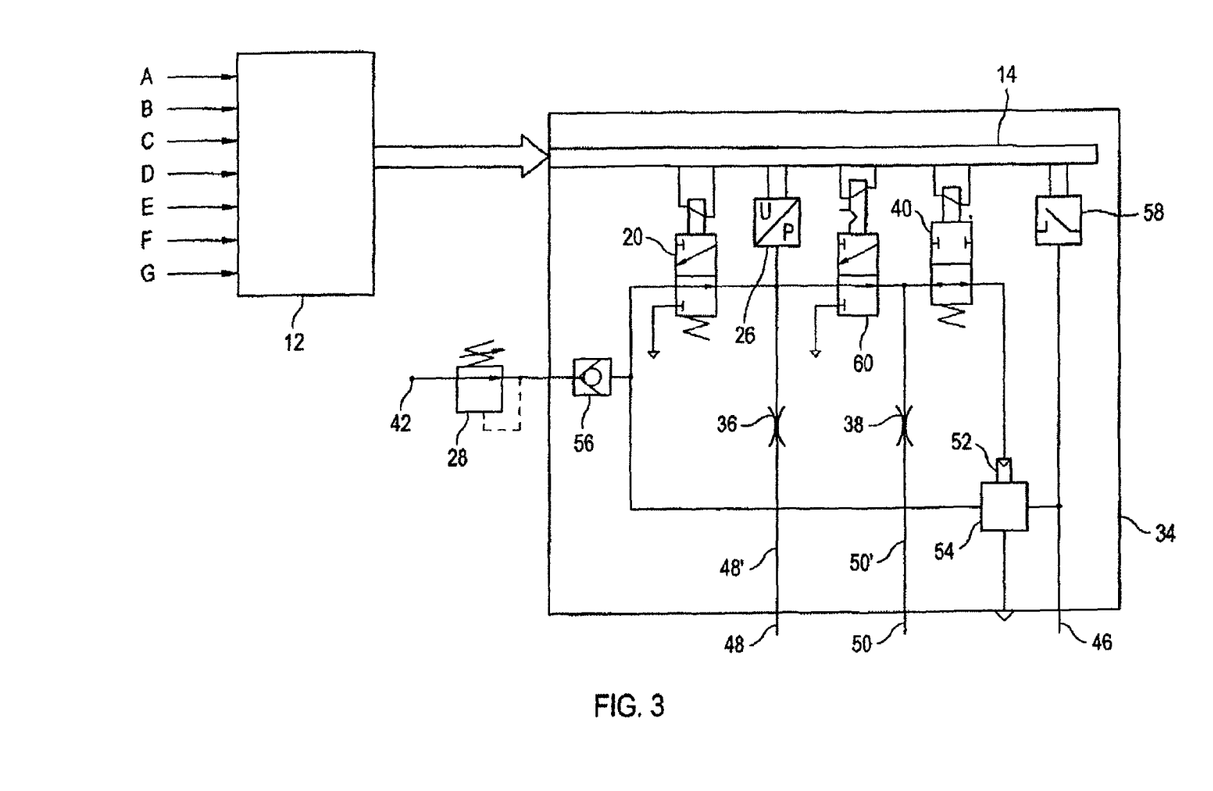
FIG. 3 shows a block circuit diagram explaining a first embodiment of a braking system according to the invention.

FIG. 3 shows a block circuit diagram explaining a first embodiment of a brake system according to the invention. In this example, the valve device 20 which can be controlled in a pulse-width-modulated fashion is integrated into an electropneumatic control unit 34 which has both a spring energy store port 46 and two control ports 48, 50 which can be coupled to a control inlet of a trailer control module. The electropneumatic control unit 34 is preferably suitable for making available the functions of an electronic parking brake system. For this purpose, the control unit 34 contains an electronic control unit 14 which is suitable for actuating various solenoid valves, specifically the valve device 20 which is configured as a 3/2-way valve and a hold valve 40 which is embodied as a 2/2-way valve. The control inlet 52 of a relay valve 54 is actuated as a function of the switched position of these abovementioned valve devices 20, 40. Working pressure is supplied to the relay valve by the compressed air supply 42 via the pressure limiter 28 and a non-return valve 56, which pressure is passed on to the spring energy store port as a function of the control pressure present at the control inlet 52. A pressure switch 58 by means of which it is possible to sense whether the spring energy store port is ventilated or vented, that is to say whether the parking brake is engaged or released, is also provided. Alternatively, a further pressure sensor, which can determine the precise pressure, can also be used instead of the pressure switch 58.

In the illustrated position of the hold valve 40 which is embodied as a 2/2-way valve, the spring energy store port 46 can be ventilated or vented as a function of the position of the 3/2-way valve. If the hold valve 40 is switched over, the pressure at the spring energy store port 46 is held.

By means of the interplay of the 3/2-way valve 20 with the hold valve 40 which is embodied as a 2/2-way valve, it is also possible to implement a test function for the commercial vehicle by virtue of the fact that specifically when the spring energy store port 46 is vented, the control inlet, connected to the control port 28, of the trailer control module is briefly ventilated via said control port 28. Ventilating this control inlet results in venting of the trailer braking system, with the result that the entire commercial vehicle has to be held in this state by the traction vehicle, in which case the vented state of the spring energy store port can be maintained by switching over the hold valve 40, embodied as a 2/2-way valve, into its pressure-holding position.

A further important task is performed by the 3/2-way valve 20 with respect to the anti-jackknifing braking function. Since the 3/2-way valve 20 is actuated in a pulse-width-modulated fashion by the electronic control units 12, 14, a selective pressure can be made available at the control port 48 for the trailer control module. In particular, the trailer can be braked independently of the braking of the traction vehicle, with the result that it is possible to prevent the trailer from running into the rear of the traction vehicle. Whether such anti-jackknifing braking is permitted depends on the driving state of the vehicle. Taking this into account makes it possible to take into account safety-critical aspects, for example steering maneuvers, and it is possible to ensure that pulse-width modulation of the 3/2-way valve 20 takes place only if the anti-jackknifing braking functionality is actually required, which greatly increases the service life of the 3/2-way valve 20. The checking as to whether the pulse-width modulation of the 3/2-way valve 20 is actually permitted is made dependent on the signals A, B, C, D, E and F. These signals characterize the following driving states of the vehicle or are derived from these driving states, for example by comparisons with threshold values:

A: Speed of the vehicle
B: Engine torque
C: Retarder status information
D: Steering angle or differential wheel speed
E: State of switches for accelerator pedal and engine brake
F: Inclination
G: Driver's request signal generator signal The information about these driving states can be obtained from a wide variety of sources. The speed of the vehicle can be obtained, for example, from the anti-blocking system or from the tachograph of the vehicle. It is also possible to use active wheel speed sensors since their signals are more precise, in particular at low speeds, than the signal from the tachograph. In addition, speed values of the navigation system can be included in the calculations as absolute values. The torque of the engine is available, for example, within the scope of the engine control system. Wheel speed sensors are present for the steering angle or differential wheel speed. The signals can basically be obtained directly or via a databus. In order to sense the inclination of the vehicle, it is also necessary, in particular, to determine that said inclination can be sensed by a sensor system; however, the inclination information can also be made available by the navigation system.

The discussed signals, and further signals under certain circumstances, or variables derived therefrom, are input into the control unit 12. Said control unit 12 may be, in particular, a control device with a watchdog function. A watchdog function is advantageous since it is a safety-relevant control function in which a microcontrol system and a computer system are failsafe and have to at least partially switch themselves off in the event of a fault. Such control devices are advantageously provided with a redundant power supply and they have a read/write memory in order to store the permissible open-loop and closed-loop control parameters as well as predefined threshold values, for example a speed threshold value and fault states. The control device can be arranged outside the electropneumatic control unit 34 or else integrated therein, in particular in a structural unit with the electronic control unit 14 which is illustrated inside the electropneumatic control unit 34. The electronic control unit 12 then brings about the pulse-width-modulated actuation of the 3/2-way valve 20 as a function of the signals A, B, C, D, E and F, in which case pulse-width-modulated actuation can be prohibited in particular if it is clear, from one or more of the information items supplied to the control unit, that anti-jackknifing braking should not take place.

The electropneumatic control unit 34 contains a further electrically actuable 3/2-way valve 60, which is configured as a bistable valve. This 3/2-way valve 60 may be configured, for example, as a solenoid valve, and it supplies the control port 50 of the electropneumatic control unit 34 with compressed air, with the result that the electropneumatic control unit 34 illustrated can make available a control pressure for the trailer control module, on the basis of either a monostable valve configuration, specifically via the 3/2-way valve 20, or of a bistable valve configuration, specifically via the 3/2-way valve 60. The electropneumatic control unit 34 can therefore cope with various requirement profiles of the commercial vehicle manufacturers. Instead of a solenoid valve, it is also possible to use any other bistable 3/2-way valve 60 as a 3/2-way valve 60. For example, it is contemplated to use a slide valve which is bistable owing to the friction which occurs during switching. Alternatively, it is also possible to use a valve with a bistable latching mechanism which can be embodied, for example, in the form of a ball point pen mechanism.

A further advantageous property of the electropneumatic control unit 34 relates to the throttles 36, 38 which are provided in line paths, denoted as trailer control lines 48', 50', to the control ports 48, 50 for the trailer control module. If, for example, an unexpected loss of compressed air occurs at the control port 48, for example due to a line break between the control port 48 and a trailer control module (not illustrated), the throttle 36 can ensure that this does not lead to sudden venting of the spring energy store port 46. Instead, a limiting pressure which is dependent on the throttle cross section is set upstream of the throttle 36 as soon as the continuous loss of pressure at the control port 48 corresponds to the further quantity of air which has been supplied by means of the compressed air supply 42. Owing to the accumulating effect of the throttle 36, it is also, in particular, activation of the parking brake of the commercial vehicle after actuation of an initially pressureless braking system which has such a defect. The limiting pressure which is set or which can be brought about during actuation is sufficiently high to ensure activation of the parking brake of the commercial vehicle. For example, given a supply pressure of 10.5 bar the limiting pressure can be 8.5 bar, and the necessary pressure level for activating the parking brake can be 8.0 bar.

Figure 4:
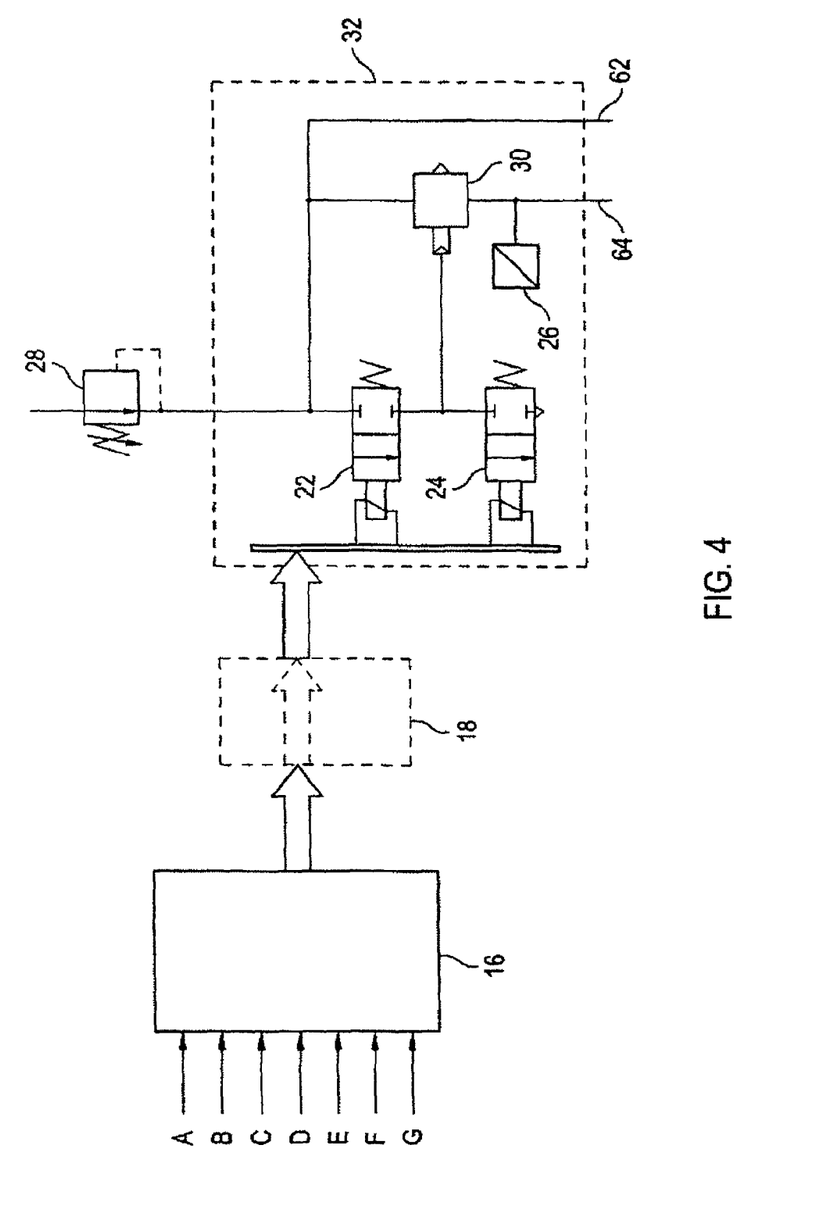
FIG. 4 shows a block circuit diagram explaining a second embodiment of a braking system.

FIG. 4 shows a block circuit diagram explaining a second embodiment of a braking system. In the exemplary embodiment illustrated here, the valve device which can be actuated in a pulse-width-modulated fashion is integrated into the trailer control module 32. The latter has a supply line port 62 for the trailer and a trailer brake line port 64. The trailer control module 32 is in turn supplied via a pressure limiter 28, downstream of which the valve device, here having two 2/2-way valves 22, 24, which can be actuated in a pulse-width-modulated fashion is connected. The valve device 22, 24 is actuated according to the same basic principle as that which has already been explained in conjunction with FIG. 3. However, the pulse-width modulation can take place, for example, with a constant pulse length, in which case the first 2/2-way valve 22 is actuated in a pulsed fashion in order to ventilate the trailer brake line, while the second 2/2-way valve 24 remains de-energized, and the second 2/2-way valve 24 is actuated in a pulsed fashion for the purpose of venting when the first 2/2-way valve 22 is de-energized. In order to hold the pressure, both 2/2-way valves 22, 24 remain de-energized. In the present exemplary embodiment, the pressure supply of the trailer brake line is provided via a relay valve 30. A direct connection of the trailer brake line to the solenoid valves 22, 24 which can be actuated in a pulse-width-modulated fashion is also conceivable. Furthermore, a 3/2-way valve can also be used instead of the 2/2-way valves. With respect to the pressure sensor 26 it is to be noted that it monitors whether the pressure which is modulated for the trailer is within a permissible control window taking account of the specifications A to G. Furthermore, the hysteresis of the system is also included. The continuity of the rise in pressure is taken into account with respect to the tolerances of the relay valve 30 and as a function of the specifications A to G. The control device 16 can have an additional electrical connection by means of which an anti-jackknifing braking request at the control device of the trailer, for example at the trailer control module 32, is electrically passed on.

FIG. 4 illustrates by way of example that a further control device 18, for example a control device which is dedicated to the trailer control module and is configured as a slave control device, can be connected downstream of the control device 16, which can be, for example, of a comparable design to that of the control device 12 according to FIG. 3. The control device 18 therefore does not have any CAN interface, for example. The main computing work is performed via the primary control device 16 which is configured as a redundant control device with redundant power supply and an EEProm memory for storing parameters and threshold values, and as a fault memory.

The solution with two 2/2-way valves with a relay valve connected downstream or without a relay valve connected downstream is also possible in conjunction with the integration of the anti-jackknifing braking functionality into the electropneumatic control unit 34 according to FIG. 3. With such an electropneumatic control unit as the one illustrated in FIG. 3 it is also possible to connect a relay valve downstream of a 3/2-way valve.

Figure 5:
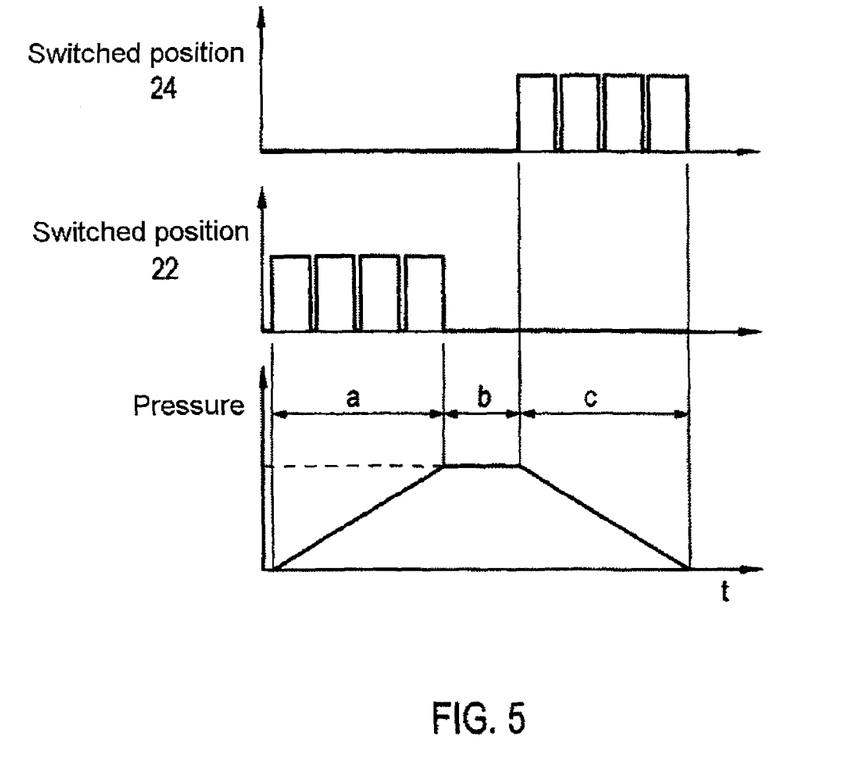
FIG. 5 shows a diagram illustration explaining pulse-width-modulated actuation of a valve device.

FIG. 5 shows a diagram illustration explaining pulse-width-modulated actuation of a valve device. The switched positions of a ventilation valve, for example of the valve 22 according to FIG. 4, and of a venting valve, for example of the valve 24 according to FIG. 4, and the associated modulated pressure profiles, for example the control pressure fed to the relay valve 30 according to FIG. 4 or the working pressure made available by the relay valve 30 at the trailer brake line port 64, are illustrated here. While the pressure is being built up, the venting valve 24 is continuously closed, while the ventilation valve 22 is actuated in a pulsed fashion. Consequently, a rise in pressure occurs. In order to hold the pressure, both valves 22, 24 remain closed. During the pressure reduction phase, the pressure buildup valve 22 remains closed while the venting valve 24 is actuated in a pulsed fashion and in this respect changes its switched position periodically.

Figure 6:
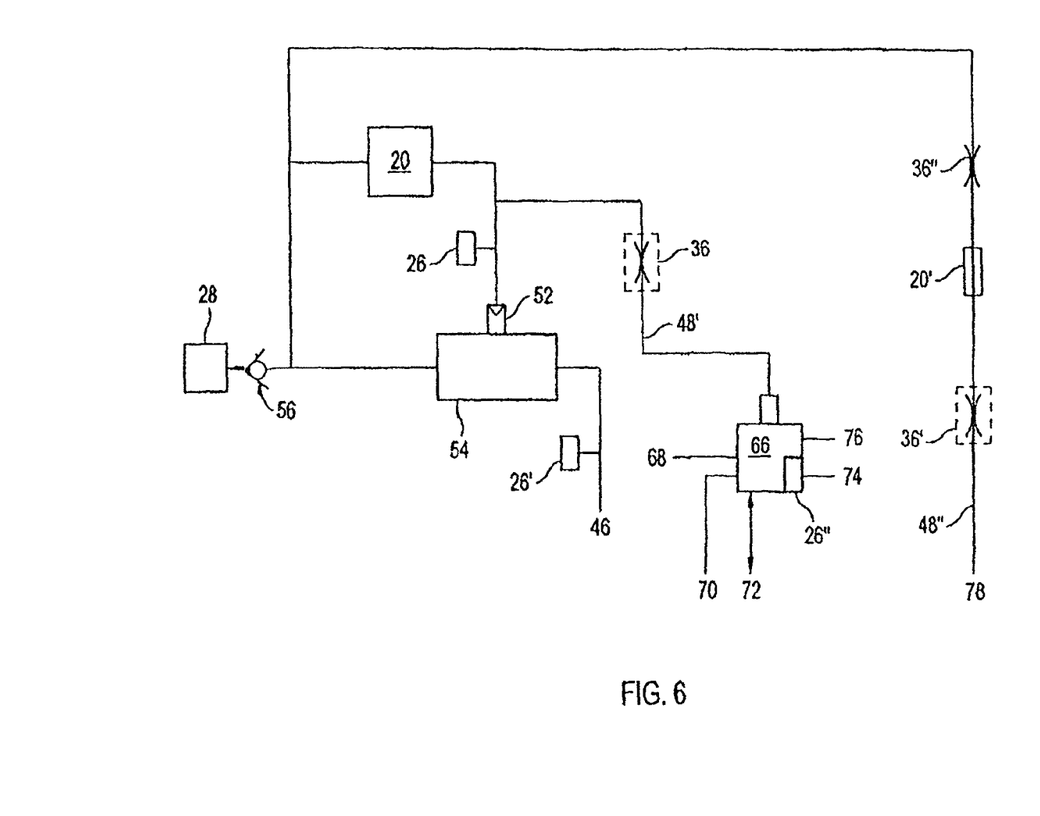
FIG. 6 shows a further embodiment of a braking system according to the invention.

FIG. 6 shows a further embodiment of a braking system according to the invention. The braking system illustrated in FIG. 6 is broadly identical to the braking system illustrated in FIG. 3, for which reason only differences are explained in detail below. A hold valve is dispensed with between the valve device 20 and the control inlet 52 of the relay valve 54 but such a hold valve can, however, optionally be inserted. The valve device 20 in this embodiment is advantageously embodied itself as a bistable 3/2-way valve with its own venting system and can be actuated in a pulse-width-modulated fashion, but this is not compulsory. The bistability of the valve device 20 can then be provided, for example, by using magnets in the form of a solenoid valve, by means of friction in the form of a slide valve which moves only under an external force, or by using a mechanical latching system, for example a ball point pen mechanism, or in some other way known to a person skilled in the art. The pressure sensor 26 is suitable, in a way which is analogous to the embodiment in FIG. 3, for detecting a drop in pressure in the region of the trailer control line 48'. A trailer control module 66, which has a pneumatic port 68, an electrical connection 70 and a connection to a CAN bus 72 on the input side, is illustrated at one end of the trailer control line 48'. On the output side, the trailer control module 66 has connections for a trailer control system 74 and a trailer compressed air reservoir 76. Within the trailer control module 66, a pressure sensor 26" is arranged which is assigned to the trailer control system 74, and in this way said pressure sensor 26" can also indirectly sense a drop in pressure in the trailer control line 48'. Furthermore, a further trailer control line 48" is illustrated with further throttles 36', 36" and a further valve device 20' via which a compressed air control port 78 is supplied. The compressed air control port 78 may serve, for example, for actuating further trailers, such as occurs in the case of multiple-trailer vehicle combinations, for example a road train. The further trailer control line 48" is protected in this case by the further throttles 36', 36", with just one of the two throttles 36', 36" being necessary to provide protection against a spontaneous loss of pressure. However, both throttles 36', 36" are shown in order to indicate various positioning possibilities during the drawing of control pressure from a supply line in parallel with the parking brake supply of the commercial vehicle. In addition to the two positioning possibilities which are illustrated upstream or downstream of the valve device 20', there is also the possibility of integrating the throttle functionality into the valve device 20' itself. The functional configuration of the valve device 20' corresponds here essentially to that of the valve device 20. The inventive idea can also be used with valve devices which are switched in various ways and which are not illustrated here explicitly. All that is essential is that all the supply pressures are extracted only downstream of the non-return valve.

Figure 7:
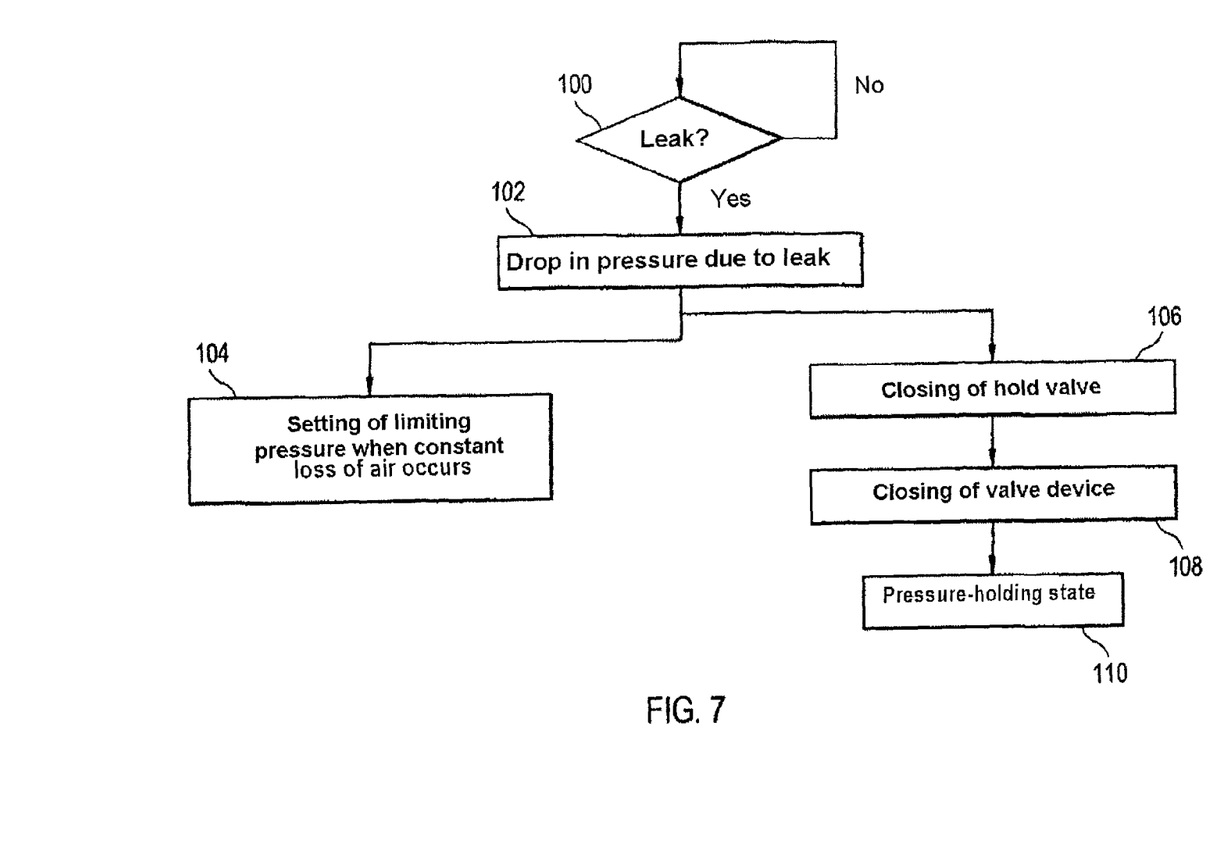
FIG. 7 shows a flowchart illustrating the method according to the invention.

FIG. 7 shows a flowchart illustrating the method according to the invention. The step 100, in which it is checked whether there is a leak in a trailer control line, is the starting point here. If one is present, 100-yes, a certain drop in pressure firstly occurs in step 102 as a result of the leak. The leak can only be detected on the basis of the drop in pressure. Different sequences can then occur depending on the embodiment of the braking system. Either a limiting pressure occurs upstream of the throttle in step 104 when there is a constant loss of air via the leak, or firstly the hold valve and then the valve device are closed in steps 106 and 108. Setting a limiting pressure when there is a constant loss of air in step 104 also permits, in particular, the parking brake of the commercial vehicle to be activated or held open. Closing the hold valve in step 106 also permits the parking brake of the commercial vehicle to be held open. However, as a result of the additional closing of the valve device in step 108, a pressure-holding state is achieved in step 110 provided that no further volume of air can flow out via the leak.

The features of the invention which are disclosed in the description above, in the drawings and in the claims may be utilized for the implementation of the invention, either individually or in any desired combination.

LIST OF REFERENCE NUMERALS

10 Control unit
12 Control unit
14 Control unit
16 Control unit
18 Control unit
20 Valve device
20' Further valve device
22 Valve device
24 Valve device
26 Pressure sensor
26' Pressure sensor
26" Pressure sensor
28 Pressure limiter
30 Relay valve
32 Trailer control module
34 Control unit
36 Throttle
36' Further throttle
36" Further throttle
38 Throttle
40 Hold valve
42 Compressed air supply
44 Trailer control port
46 Spring energy store port
48 Control port
48' Trailer control line
48" Further trailer control line
50 Control port
50' Trailer control line
52 Control inlet
54 Relay valve
56 Non-return valve
58 Pressure switch
60 3/2-way valve
62 Supply line port
64 Trailer brake line port
66 Trailer control module
68 Pneumatic port
70 Electrical connection
72 CAN bus
74 Trailer control system
76 Trailer compressed air reservoir
78 Compressed air control port
100 Leak
102 Drop in pressure due to leak
104 Reaching of limiting pressure
106 Closing of hold valve
108 Closing of valve device
110 Pressure-holding state

The invention claimed is:

1. A braking system for a commercial vehicle which can be coupled pneumatically to a trailer, comprising:
at least one electronic control unit; and
a valve device, which is switchable electrically by the at least one electronic control unit, wherein in a switched state of the at least one valve device pressure can be built up for a trailer parking braking system, which pressure brings about parking braking of the trailer,
wherein a throttle is arranged in a trailer control line which, in the event of a leak downstream of the throttle, limits a pressure drop at a control inlet of a relay valve that controls a spring energy store port of the commercial vehicle's spring-loaded brake cylinders.

2. The braking system as claimed in claim 1, wherein a compressed air supply of the braking system is provided by way of a pressure limiter.

3. The braking system as claimed in claim 2, wherein a non-return valve is arranged downstream of the pressure limiter in order to jointly protect a parking brake of the commercial vehicle and a trailer parking brake control system.

4. The braking system as claimed in claim 3, wherein the compressed air supply of the parking brake of a commercial vehicle is provided in parallel with a compressed air supply of the trailer parking brake control system.

5. The braking system as claimed in claim 1, wherein a pressure sensor senses a control pressure for a trailer braking system and transmits a corresponding signal to the electronic control unit.

6. The braking system as claimed in claim 1, wherein a hold valve is arranged between the electrically switchable valve device and a relay valve.

7. A method for controlling a braking system for a commercial vehicle, which is couplable pneumatically to a trailer, the braking system comprising at least one electronic control unit, a valve device which is switchable electrically by the at least one electronic control unit, wherein in a switched state of the valve device pressure can be built up for the trailer parking braking system, which pressure brings about parking braking of the trailer, and a throttle which is arranged in a trailer control line, the method comprising the acts of:
detecting a leak downstream of the throttle; and
limiting, by way of the throttle, a pressure drop which occurs when the leak is detected downstream of the throttle, wherein a control inlet of a relay valve that controls a spring energy store port of the commercial vehicle's spring-loaded brake cylinders is arranged upstream of the throttle.

8. The method as claimed in claim 7, wherein when a leak has occurred, a valve device which is arranged upstream of the control inlet is closed in order to avoid a pressure drop at the control inlet.

9. The method as claimed in claim 8, wherein the electrically switchable valve device interrupts further feeding-in of compressed air in order to stop a continuous loss of air when the leak has occurred.

10. The method as claimed in claim 9, wherein, in parallel with the outputting of the pressure signal at the control ports, a corresponding electrical control signal is transmitted via a CAN bus.

11. The method as claimed in claim 10, wherein the electrical control signal and the pressure signal are compared with one another; and
a leak is reported via the CAN bus if the signals are not equivalent.

12. The method as claimed in claim 11, wherein when signals are not equivalent the electrical signal is used to control the trailer.

13. The method as claimed in claim 7, wherein when a leak has occurred an electrical signal is transmitted to the control device in order to reduce or to prevent braking of the trailer.

14. The method as claimed in claim 7, wherein a fault message is output to the driver of the commercial vehicle if a leak is detected.

15. The method as claimed in claim 7, wherein a fault entry is made in a fault memory if a leak is detected.

16. The method as claimed in claim 7, wherein a leak in a trailer control line is detected by a pressure sensor, which is arranged upstream of the throttle.

17. The method as claimed in claim 7, wherein a leak in a trailer control line is detected by a pressure sensor, which is arranged in a trailer control module.

18. The method as claimed in claim 7, wherein a leak in a trailer control line is detected by a wheel speed sensor, which is arranged on a trailer.

* * * * *